United States Patent
Honma et al.

(10) Patent No.: US 10,493,565 B2
(45) Date of Patent: Dec. 3, 2019

(54) T-DIE AND METHOD OF MANUFACTURING THE SAME

(71) Applicant: Toshiba Kikai Kabushiki Kaisha, Tokyo-To (JP)

(72) Inventors: Shuhei Honma, Numazu (JP); Ryota Oke, Numazu (JP); Yosuke Ogino, Numazu (JP); Tomonori Yamaguchi, Numazu (JP); Seiya Mizuno, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 642 days.

(21) Appl. No.: 15/264,189

(22) Filed: Sep. 13, 2016

(65) Prior Publication Data

US 2017/0066085 A1    Mar. 9, 2017

Related U.S. Application Data

(62) Division of application No. 14/425,506, filed as application No. PCT/JP2013/073418 on Aug. 30, 2013, now abandoned.

(30) Foreign Application Priority Data

Sep. 4, 2012    (JP) ................................ 2012-194216

(51) Int. Cl.
*B29C 48/30*    (2019.01)
*B23K 26/70*    (2014.01)
(Continued)

(52) U.S. Cl.
CPC ............ *B23K 26/70* (2015.10); *B23K 26/342* (2015.10); *B29C 48/30* (2019.02);
(Continued)

(58) Field of Classification Search
CPC ....... B21C 25/06; B24D 3/004; B29C 48/151; B29C 48/152; B29C 48/153;
(Continued)

(56) References Cited

U.S. PATENT DOCUMENTS

| 3,030,660 A | * | 4/1962 | Gallant | B29C 48/30 |
| | | | | 425/466 |
| 4,200,669 A | * | 4/1980 | Schaefer | B05B 7/228 |
| | | | | 219/121.6 |
| 2007/0267774 A1 | * | 11/2007 | Ueda | B29C 55/06 |
| | | | | 264/211.11 |

FOREIGN PATENT DOCUMENTS

| CN | 102791386 A | 11/2012 |
| JP | S64-056860 | 3/1989 |

(Continued)

OTHER PUBLICATIONS

International Search Report issued in PCT/JP2013/073418 dated Sep. 24, 2013.
(Continued)

*Primary Examiner* — Matthew J Daniels
*Assistant Examiner* — Nicholas R Krasnow
(74) *Attorney, Agent, or Firm* — DLA Piper LLP US

(57) ABSTRACT

On at least the edge portion (9e) of the lip portion (9) of a T-die (1), a cladding layer (10) is provided. The cladding layer is formed by laser build-up welding to a base material with a powder of a corrosion resistant and wear resistant alloy comprising a nickel-based alloy or a cobalt-based alloy. The cladding layer has a metallographic structure in which metal borides are dispersed in a binder phase. The lip portion has high quality and has high durability. The manufacturing costs of the T-die can also be kept relatively low.

7 Claims, 5 Drawing Sheets

(51) Int. Cl.
  *B29C 48/305* (2019.01)
  *B23K 26/342* (2014.01)
  *C23C 18/16* (2006.01)
  *C23C 18/18* (2006.01)
  *B23K 101/34* (2006.01)
  *B23K 103/08* (2006.01)
  *B23K 103/16* (2006.01)
  *B23K 103/00* (2006.01)
  *B29L 31/00* (2006.01)

(52) U.S. Cl.
  CPC ........ *B29C 48/3003* (2019.02); *B29C 48/305* (2019.02); *C23C 18/1637* (2013.01); *C23C 18/1806* (2013.01); *B23K 2101/34* (2018.08); *B23K 2103/08* (2018.08); *B23K 2103/16* (2018.08); *B23K 2103/52* (2018.08); *B29L 2031/757* (2013.01)

(58) Field of Classification Search
  CPC ... B29C 48/154; B29C 48/155; B29C 48/156; B29C 48/157; B29C 48/266; B29C 48/2665; B29C 48/3003; B29C 48/34; B29C 48/509; B29C 48/6803; B29C 55/026; B32B 17/10174; B32B 17/10183; B32B 17/10192; B32B 17/10201; B32B 17/10211; B32B 17/1022; B32B 17/10229; B32B 17/10238
  See application file for complete search history.

(56) References Cited

FOREIGN PATENT DOCUMENTS

| | | |
|---|---|---|
| JP | H02-030396 | 1/1990 |
| JP | H06-042146 | 6/1994 |
| JP | 2006-224462 | 8/2006 |

OTHER PUBLICATIONS

English Language Abstract and Translation for JP 2006-224462 published Aug. 31, 2006.
English Language Abstract for JP H02-030396 published Jan. 31, 1990.
English Language Abstract for JPS64-056860 published Mar. 3, 1989.
English Language Translation for JP H06-042146 published Jun. 3, 1994.
Chinese Office Action issued in CN 201380046195.7 dated Jan. 19, 2016 with English Language Translation.
Wang Juan et al., "Technique of Surface Build-up Welding and Spray Coating" pp. 1-3, Chemical Industry Publisher, Sep. 30, 2004 (with English Langguage Translation).
Jiaheng Lei et al., "Ordinary Chemistry (new edition)" pp. 179-180, Chemistry Publisher, Mar. 31, 2009 (with English Language Translation).
English Language Abstract and Translation of CN 102791386A published on Nov. 21, 2012.
Office Action in DE Application No. 112013004338.6 dated Feb. 27, 2019.

\* cited by examiner

T-DIE AND METHOD OF MANUFACTURING THE SAME

CROSS REFERENCE TO RELATED APPLICATIONS

This application is a divisional application of U.S. application Ser. No. 14/425,506, filed Mar. 3, 2015, which is a U.S. National Stage Application of International Application No. PCT/JP2013/073418 filed Aug. 30, 2013, which claims priority from Japanese Patent Application No. 2012-194216 filed Sep. 4, 2012. The entirety of all the above-listed applications are incorporated herein by reference.

TECHNICAL FIELD

The present invention relates to a T-die having a slit-shaped discharge port used for forming a film or a sheet comprising a resin material, and a manufacturing method thereof.

BACKGROUND ART

One of methods for manufacturing a resin film extrudes a molten resin by using a die having a slit-shaped orifice (discharge port) referred to as a T-die. In particular, resin films for optical use are required to have high uniformity in film thickness and to be free of die lines (longitudinal streaks in an extrusion direction). Accordingly, it is required for a T-die used in this application as follows: the inner wall surface of a molten resin flow channel inside the T-die is smooth and has less friction with a molten resin; a lip portion at the tip end of an orifice has a high dimensional accuracy and has a sharp edge; and the T-die has high durability to maintain the aforementioned conditions for a long time. So far, in correspondence to the requirements, a coating layer such as a hard chromium plating layer has been provided to a molten resin flow channel and a harder hard coating layer has been provided at a lip portion.

Patent Document 1 describes to provide a WC-based coating layer onto a lip portion by means of flame spraying, the WC-based coating layer comprising an alloy formed by mixing WC particles as hard particles and Ni, Co, or Cr as a binder. A hard chromium plating layer is provided to the inner wall surface of a molten resin flow channel at portions other than the lip portion. However, since such a coating layer is relatively brittle, the layer tends to suffer from a defect such as peeling, cracking, or chipping upon finishing the edge portion by grinding and polishing after flame spraying. Such defect causes die lines to occur. Further, since adhesion between the WC-based coating layer and the hard chromium plating layer is not so satisfactory, peeling or cracking may possibly be caused between the two layers.

Patent Document 2 describes a T-die formed by bonding, to a main body, tabular lip member comprising a super hard alloy by means of a ceramic type adhesive. According to this constitution, a lip edge can be finished into a sharp edge. However, the super hard alloy has inferior adhesion with a hard chromium plating layer. Besides, it is difficult to apply plating finish to a portion other than the lip portion due to presence of the adhesion portion. Further, ensuring a sufficient adhesion strength requires a large adhesion area by enlarging the super hard alloy portion. However, this increases the material cost.

Patent Documents 3 and 4 each describe a method of forming a lip portion by bonding a corrosion resistant and wear resistant alloy powder through sintering and simultaneous diffusion bonding by Hot Isostatic Process (HIP) to a die main body comprising an austenite/ferrite double phase stainless steel alloy. A B (boron)-containing Ni-based alloy or cobalt-based alloy is used as the corrosion resistant and wear resistant alloy. A hard chromium plating layer is disposed to the inner wall surface of a molten resin flow channel at portions other than the lip portion. Since the lip portion obtained by the method described in the Patent Documents 3 and 4 has a dense metallographic structure with less defects, the edge portion can be formed into a sharp edge at high accuracy. However, an extremely complicated, expensive, and large-scaled manufacturing equipment is required for practicing the method described in the Patent Documents 3 and 4. Further, since the die main body in the HIP process is exposed to high temperature and high pressure, for example, at 1300° C. and 130 MPa, the die main body is distorted and bent. In this case, it is necessary to apply fabrication to the die main body including allowance therefor (particularly, refer to Patent Document 3). Thus, the method described in the Patent Documents 3 and 4 involves a problem of requiring enormous amount of labors and costs.

PRIOR ART DOCUMENTS

Patent Documents

PATENT DOCUMENT 1: JP-A-2006-224462
PATENT DOCUMENT 2: JP-A-2007-196630
PATENT DOCUMENT 3: JP-A-2012-20434
PATENT DOCUMENT 4: JP-A-2011-235500

SUMMARY OF THE INVENTION

Problem to be Solved by the Invention

The present invention provides a T-die in which a lip portion has high quality and high durability, and which can be manufactured at a relatively low cost, and a manufacturing method thereof.

Means for Solving the Problem

The present invention provides a T-die comprising die main body provided therein with a fluid material flow channel and having a lip portion that forms a slit-shaped discharge portion at the tip end of the fluid material flow channel. The lip portion includes a cladding layer formed at least an edge portion thereof, the cladding layer being formed by laser build-up welding to a base material with a powder of a corrosion resistant and wear resistant alloy comprising a nickel-based alloy or a cobalt-based alloy. In a preferred embodiment, the cladding layer has a metallographic structure in which metal borides or metal carbides are dispersed in a binder phase.

In a preferred embodiment of the T-die, a plating layer is disposed on the inner wall surface of the fluid material flow channel in continuity with the cladding layer. The present invention also provides a method of manufacturing the T-die having such a plating layer. The manufacturing method includes: a step of providing a material having a first surface that is a lip mating face, a second surface that is a lip end face, and a third surface that connects the first surface and the second surface and is inclined thereto; a step of forming a cladding layer by laser build-up welding over the third surface with a powder of a corrosion resistant and wear resistant alloy; a step of subsequently grinding the first surface and the second surface of the material together with portions of the cladding layer adjacent to the first surface and the second surface; a step of subsequently forming a plating layer over the surface of the cladding layer and over the first surface of the material; and a step of subsequently grinding the plating layer such that the cladding layer is exposed and the cladding layer has a surface flush with the surface of the plating layer lying over the first surface of the material.

EMBODIMENTS FOR CARRYING OUT THE INVENTION

A preferred embodiment of the invention is to be described with reference to the appended drawings.

Figure 1A:
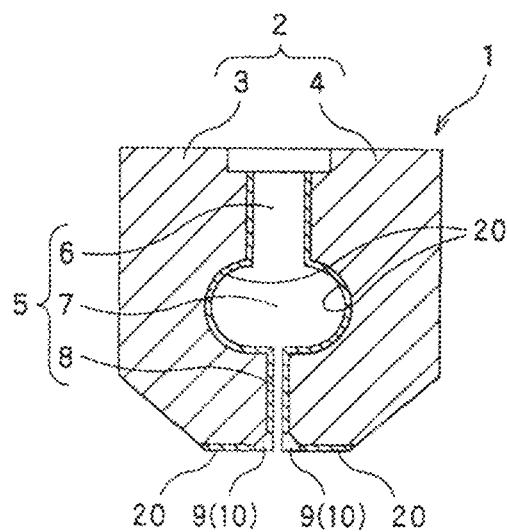
FIG. 1A is an entire view of a longitudinal cross sectional view of a T-die according to an embodiment of the present invention.
Figure 1B:
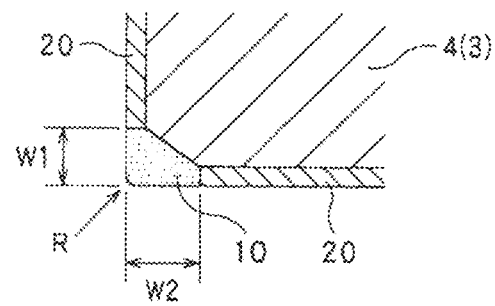
FIG. 1B is a diagram showing the vicinity of a lip edge of a T-die according to an embodiment of the present invention at an enlarged scale.
Figure 2:
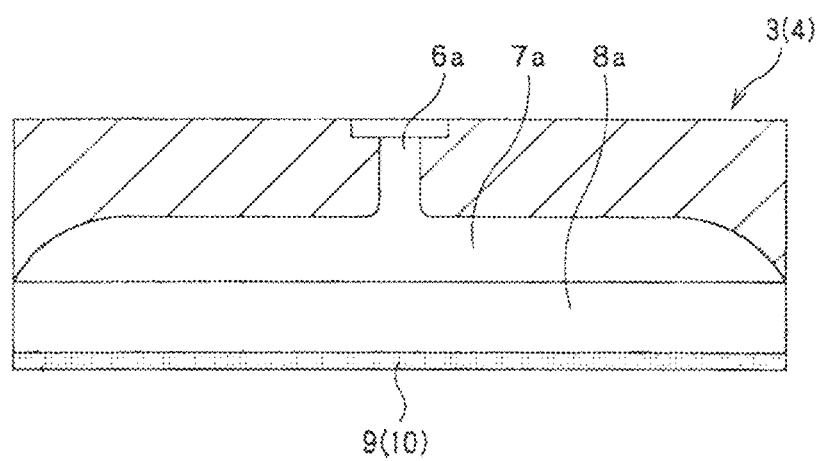
FIG. 2 is a side elevational view showing an inner wall surface of a die main body of the T-die shown in FIG. 1.

As shown in FIGS. 1A, 1B and 2, a T-die 1 has a die main body 2 comprising a pair of die members 3, 4. A molten resin flow channel (fluid material flow channel) 5 is formed between the die members 3 and 4. The molten resin flow channel 5 has a charge portion 6, a manifold portion 7, and a slit shape discharge portion 8 orderly from the upstream. The charge portion 6 at the longitudinal central portion of the T-die 1 is connected to a not illustrated extruder and a molten resin is supplied from the charge portion 6 into the molten resin flow channel 5. The supplied molten resin flows into the manifold portion 7 of a substantially circular cross section extending in the longitudinal direction of the T-die 1, spreads in the longitudinal direction of the T-die 1, then flows into the slit shape discharge portion 8, and is extruded in the form of a film from the opening end edge of the discharge portion 8 onto a not-illustrated roller. A portion near the open end edge of the discharge portion 8 of each of the die members 3 and 4 is referred to as a lip portion 9. In FIG. 2, references 6a, 7a, and 8a show wall surfaces of the die member 3 (4) facing the charge portion 6, the manifold portion 7, and the discharge portion 8 respectively. As is well-known to a person skilled in the art, the extrusion molding machine is formed by an extruder main body (not illustrated) that melts and extrudes a powdery or granular resin material, the T-die attached to the discharge port of the extruder main body, and a roller (not shown) that receives a film-like resin extruded from a T-die.

The lip portion 9 of the T-die 1 is formed of a cladding layer 10 formed by bonding an alloy powder of good corrosion resistance and wear resistance by powder laser build-up welding to the die members 3, 4 as a base material. The cladding layer 10 is depicted by a satin pattern in each of the drawings. A plating layer 20 is formed to the surface (inner wall surface) of the die members 3, 4 facing the molten resin flow channel 5. The plating layer 20 is formed also at the lower surface of the die members 3 and 4 in continuity with the lip portion 9. As clearly shown particularly in FIG. 1B, the plating layer 20 is disposed in continuity with the cladding layer 10.

It is preferred that the plating layer 20 has low friction resistance to the molten resin and has such wear resistance as not to be worn easily even when exposed to the flow of the molten resin. Further, where a corrosive gas evolves from the molten resin, the plating layer 20 preferably has such a corrosion resistance as not corroded easily by the corrosive gas. Specifically, the plating layer 20 can be formed of a hard chromium plating layer. Any plating layer 20 may be used so long as it has the properties described above and, for example, may also be an electroless nickel plating layer.

The material forming the cladding layer 10 is preferably a powder comprising a nickel-based alloy or a cobalt-based alloy. Most of nickel-based alloys or cobalt-based alloy are often excellent in the corrosion resistance and the wear resistance, thus suitable to the use of resin molding. The nickel-based alloy or the cobalt-based alloy has excellent bonding strength with iron and steel materials that can be used suitably as the material for the die main body and is suitable as a clad welding material. Nickel-based alloys or cobalt-based alloys of various compositions are commercially available and suitable one can be selected in accordance with properties that are considered important (for example, wear resistance, corrosion resistance, easy formability to sharp edge, toughness, and bondability to the die main body). In particular, a nickel-based alloy or a cobalt-based alloy with addition of B (boron) or C (carbon) shows a metallographic structure in which a B compound or a C compound is dispersed in a binder phase and, accordingly, the alloy has high strength and is excellent in the wear resistance. Generally, a material of higher hardness can form the edge portion having higher sharpness (sharp edge) compared with the material not having high hardness. Thus, also in this respect, the material of higher hardness is suitable as a material for the lip portion of the T-die.

Suitable compositions of the nickel-based alloy powder as the material of the cladding layer 10 are shown by the following four examples:

(Ni alloy-1) 71.65 wt % Ni, 20.0 wt % Mo, 3.1 wt % B, 5.2 wt % Si, and 0.05 wt % C;

(Ni alloy-2) 65.92 wt % Ni, 20.5 wt % Mo, 5.0 wt % Cu, 3.3 wt % B, 4.7 wt % Si, and 0.08 wt % C;

(Ni alloy-3) 54.14 wt % Ni, 22.5 wt % Mo, 9.5 wt % W, 5.0 wt % Cu, 2.8 wt % B, 5.4 wt % Si, and 0.66 wt % C; and (Ni alloy-4) 57.0 wt % Ni, 16.5 wt % Cr, 17.0 wt % Mo, 5.0 wt % Fe, and 4.5 wt % W.

Suitable compositions for the cobalt-based alloy powder are shown below by the following two examples:

(Co alloy-1) 68.5 wt % Co, 20.0 wt % Cr, 5.1 wt % W, 1.5 wt % Ni, 3.1 wt % B, and 1.8 wt % Si; and (Co alloy-2) 46.0 wt % Co, 30.0 wt % Cr, 2.5 wt % C, 1.0 wt % Si, 1.0 wt % Mn, 1.0 wt % Mo, 3.0 wt % Fe, 3.0 wt % Ni, and 12.5 wt % W.

By using the nickel-based alloy powder or the cobalt-based alloy powder having the composition described above, a cladding layer 10 having a hardness of 460 to 900 Hv can be obtained.

As shown in FIG. 1B, a preferred dimension of the cladding layer 10 is, for example, such that a cladding layer width W1 on the side of the lip mating face is 0.2 to 1.7 mm, and a cladding layer width W2 on the side of the lip end face from the edge is 0.2 to 2.4 mm. A suitable embodiment is, for example, such that the cladding layer width W1 on the lip mating face side is 1.2 mm, the cladding layer width W2 on the lip end face side is 2.1 mm, and an entire length of the lip portion 9 is 1100 mm. In FIG. 1B and FIGS. 3A-3F, the thickness of the plating layer 20 is expressed rather thick in order to make the drawings easy to see. However, the thickness of the plating layer 20 is actually less than 100 µm, for example, several tens µm in the final product, which is considerably smaller than the thickness of the cladding layer 10.

The reason for setting the dimension of the cladding layer 10 as above is described below.

Only considering the performance of the T-die 1, it may suffice that only the edge portion 9e of the lip portion 9 which undergoes the largest burden is formed of the cladding layer 10 and other portion than the edge portion 9e in contact with the molten resin can be formed of the plating layer 20 (hard chromium plating layer, electroless plating layer, or the like) that can be formed at a reduced cost than that for the cladding layer 10 with no problem at all. Since the material for the cladding layer 10 is extremely expensive, it is not preferred to make the dimension of the cladding layer 10 so large with a view point of reducing the cost.

However, when a defect, for example, chipping is caused to the lip portion 9 (particularly edge portion 9e), since the defect can be repaired by grinding or polishing, it is preferred that the dimension of the cladding layer 10 is larger to some extent.

Further, also with a view point of a manufacturing technique, a portion within a predetermined range from the edge portion 9e is preferably formed of the cladding layer 10. T-dies for molding a resin sheet of large width include those of long size having a longitudinal width of three meters or more. In the case of such layer size, bending may possibly occur to some extent in the material for the die members 3, 4 even by laser build-up welding that can be applied at a low strain. Once bending occurs in the direction of the thickness of the die member, such bending is rather difficult to repair. When the cladding layer width W2 on the side of the lip end face is set somewhat larger, even when bending occurs in the direction of the thickness of the die member, the lip portion 9 can be fabricated into a linear form by grinding. Since bending less occurs in the direction of the height of the die member compared with the bending in the direction of the thickness of the die member, the cladding layer width W1 on the side of the lip mating face may be smaller than the cladding layer width W2 on the side of the lip end face.

When each of the cladding layer width W1 on the side of the lip mating face and the cladding layer width W2 on the side of the lip end face of the cladding layer 10 is less than 0.2 mm, since the cladding layer 10 is formed as an edge shape and plating film of good quality cannot be obtained in the plating process applied subsequently to cause a defect such as peeling and chipping at the boundary between the cladding layer and the chromium plating, which is not preferred. Then, with this point of view, the cladding layer widths W1, W2 are preferably 0.2 mm or more.

Further, it has been known that when the diameter of the laser light is 2.4 mm upon laser build-up welding, cracking or blow hole does not occur in the cladding layer and, in addition, cladding can be performed at a high efficiency. For performing the build-up welding efficiently by a laser of a light diameter of 2.4 mm (welding is performed by one pass with no weaving), the width of the build-up welding surface (inclined surface 4a shown in FIG. 3) is preferably equal to or slightly larger than 2.4 mm. As the cladding layer widths W1, W2 satisfying the condition, a combination of W1=1.7 mm and W2=1.7 mm can be adopted. Further, when the cladding layer width W1 on the side of the lip mating face is set to a minimum value of 0.2 mm, the cladding layer width W2 on the side of the lip end face can be set to 2.4 mm at the maximum.

In view of the above, it can be concluded that the cladding layer width W1 is preferably 0.2 to 1.7 mm and the cladding layer width W2 is preferably 0.2 to 2.4 mm. To be precise, a preferred value for the cladding layer width W1, W2 in the final product of the T-die 1 is a value obtained by subtracting the thickness of the plating layer 20 from the preferred value of the cladding layer widths W1, W2. However, since the thickness of the plating layer in the final product is several tens µm, which is rather smaller than that of the cladding layer width W1, W2, this is neglected herein for the sake of explanation.

The radius R of the edge portion 9a of the lip portion 9 (refer to FIG. 1B), that is, the edge R is preferably 1 to 10 µm. In a resin film manufactured by an extruder using a T-die, it has been known that as the edge R is smaller, deviation of thickness, streak defect (die line), and resin stagnation are mitigated more. Accordingly, edge R of 10 µm or less is one of the standards for "sharp edge" in the industry. However, in the die members 3, 4 manufactured by the following method using the material described above, if the edge R is less than 1 µm, this is not economical since chipping is caused to the edge portion more frequently during manufacture, upon attachment or detachment before and after use, during cleaning, and the like. With the reason described above, the edge R is preferably 1 to 10 µm and, more preferably, 1 to 2 µm particularly.

As the material for the die members 3, 4, it is preferred to use a steel material having a coefficient of thermal expansion close to that of the nickel-based alloy or cobalt-based alloy formed by laser build-up welding of the alloy powder described above. Since powder laser build-up welding gives less heat effect on the base material, inexpensive structural alloy steels of low heat resistance, for example, SCM 420-SCM 435 may be used as the base material with no problems. By using such inexpensive structural alloy steels, the advantage of the hard chromium plating can be provided effectively. Naturally, the kind of the steel as the base material can be changed in accordance with the necessity and, for example, martensitic stainless steels excellent in corrosion resistance and hardness, specifically, SUS 42032 or steels of similar kind can also be used, although the cost is increased. The coefficient of thermal expansion of the Ni-based alloy and the Co-based alloy is generally 10.5 to $12.5 \times 10^{-6}/°$ C., which is preferred also with a view point that this is close to the coefficient of thermal expansion of the structural alloy steels and the martensitic stainless steels described above.

Then, a method of manufacturing the die members 3, 4 of the T-die 1 is described for an example of the die member 4 with reference to FIGS. 3A-3F.

Figure 3A:
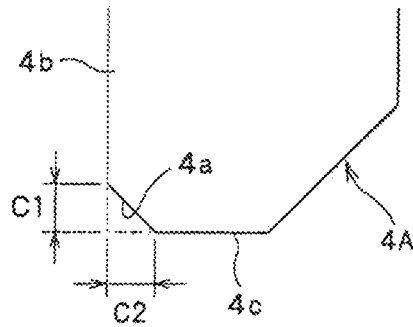
FIGS. 3A-3F are diagrams showing separate stages in a method of manufacturing the T-die shown in FIG. 1.

First, a material 4A for a die member 4 of a shape substantially identical with that of a final shape (that is, larger than the final shape by a working allowance) is provided (hereinafter referred to as "die material"). Then, as shown in FIG. 3A, a vicinity of a portion of the die material 4A to form an edge portion of a lip portion 9 is chamfered (that is, a portion shown by a broken line is removed). In this case, a chamfering amount (dimension C1, C2) is preferably 4 mm or less. In this case, the width for the inclined surface 4a is $[(4)^2+(4)^2]^{1/2}=5.6$ mm or less. When the cladding layer width W1 is set within a range of 0.2 to 1.7 mm and the cladding layer width W2 is set within a range of 0.2 to 2.4 mm as described above, the width for the inclined surface $4a$ is preferably within a range of $[(0.2)^2+(0.2)^2]^{1/2}$ to $[(1.7)^2+(2.4)^2]^{1/2}$, that is, from about 0.28 mm to about 3 mm. However, the operability of the build-up welding may be lowered if the width for the inclined surface $4a$ is smaller than the laser light diameter (spot diameter) where the laser light diameter is 2.4 mm as described above. Thus, the width for the inclined surface $4a$ is more preferably within a range of 2.4 mm to 3 mm.

Figure 3D:
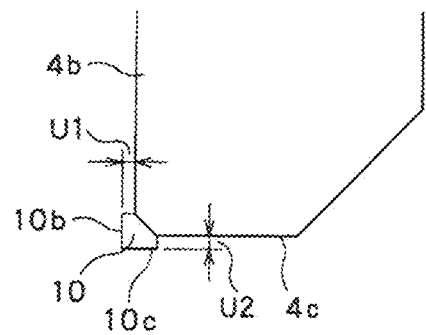
Figure 3B:
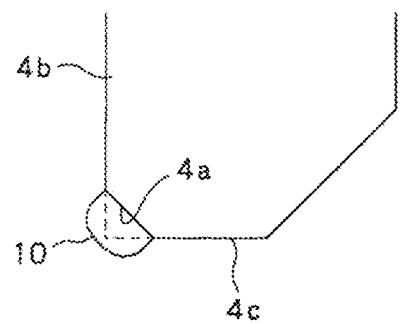

Then, as shown in FIG. 3B, a cladding layer 10 is piled up by cladding the nickel-based alloy powder (may also be cobalt-based alloy powder) by laser build-up welding over the inclined surface $4a$ formed by chamfering. The laser build-up welding is to be described specifically later.

Figure 3E:
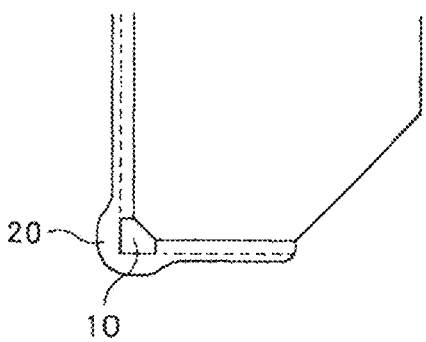
Figure 3C:
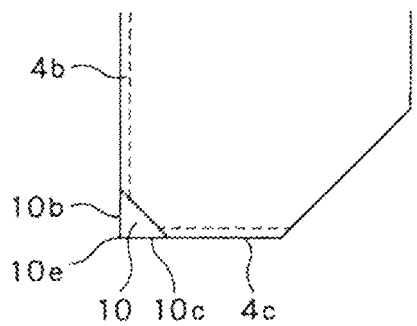

Then as shown in FIG. 3C, the cladding layer 10 is partially removed by grinding such that the cladding layer 10 has a surface $10b$ and a surface $10c$ in flush with the lateral surface $4b$ (lip mating face, that is, surface as an inner surface of a slit shape discharge portion 8), and a lower surface $4c$ (surface as a lip end face) of the die material 4A respectively. That is, a portion outside of a broken like of the cladding layer 10 shown in FIG. 3B is removed. As a result, a portion where the surface $10b$ and the surface $10c$ of the cladding layer 10 intersect forms an edge $10e$ (right angle edge). During grinding, a portion of the die material 4A may be ground. Grinding from the state shown in FIG. 3B to the state shown in FIG. 3C may be saved. In this case, a state equivalent with the state shown in FIG. 3F can be attained by grinding the cladding layer 10 during grinding for transferring the state shown in FIG. 3E to the state shown in FIG. 3F to be described later. However, in this case, since a relatively large amount of the cladding layer 10 has to be ground simultaneously with the plating layer 20 and this is not preferred with a view point of workability, it is desirable to perform a series of working steps shown in FIGS. 3A-3F.

Then, as a pretreatment to hard chromium plating, under cutting is applied for removing the lateral surface $4b$ and the lower surface $4c$ respectively so as to be lower than the surface $10b$ and the surface $10c$ of the cladding layer 10 as shown in FIG. 3D. In this case, a portion of the cladding layer 10 in contact with the die material 4A is also removed together. That is, portions of the cladding layer 10 and the die material 4A that are situated outside of the broken line shown in FIG. 3C are removed. The depth U1, U2 for under cutting is determined while considering the thickness of the plating layer 20 to be obtained finally. For example, the depth U1, U2 is set to a value substantially equal with or slightly larger than the thickness of the plating layer 20 obtained finally.

Then, as shown in FIG. 3E, hard chromium plating is applied over the entire surface of the die material 4A facing a molten resin flow channel 5 (including the lateral surface $4b$), the cladding layer 10, and the lower surface $4c$ of the die material 4 (surface as a lip end face), thereby forming a plating layer 20 comprising hard chromium. The thickness of the plating layer 20 is set to a value sufficiently larger than the final thickness, for example, about 100 μm since grinding is to be applied subsequently. In application with hard chromium plating, an appropriate plating inhibition means (for example, masking) can be provided to a portion not requiring plating. Alternatively, plating may be removed from the portion not requiring plating by grinding or the like after the plating.

Figure 3F:
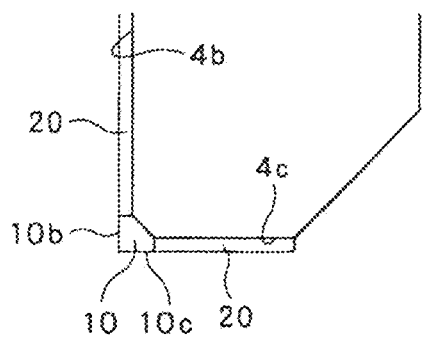

Then, as shown in FIG. 3F, grinding is performed such that the hard chromium plating layer 20 over the lateral surface $4b$ and the lower surface $4c$ of the die material 4A are flush with the surfaces $10b$ and $10c$ of the cladding layer 10 respectively. That is, portions outside the broken lines of the plating layer 20 shown in FIG. 3E are removed. Grinding is further preceded slightly from the state and sharp edging is applied such that the edge R of the edge portion $10e$ of the cladding layer 10 (the portion forms the edge portion $9e$ of the lip portion 9) is from 1 to 2 μm. In this step, a portion of the surfaces $10b$, $10c$ of the cladding layer 10 is slightly ground. After the grinding described above, polishing or lapping for mirror finishing may also be applied. Since the cladding layer 10 formed by using the material as exemplified above has a good balance between the hardness and the toughness and also has a small difference of hardness to the hard chromium plating layer 20, which is simultaneously in contact with the abrasive stone used for grinding the cladding layer 10, the edge portion of the lip portion can easily be sharp edged by grinding. It has been confirmed also that the edge portion $9e$ having an edge R of 2 μm can be fabricated in actual manufacture with no problem.

Further, the surface of the hard chromium plating of the die material 4A facing the molten resin flow channel 5, particularly, the surface facing the manifold portion and the hard chromium plating surface facing the slit shape discharge portion are preferably mirror finished by buff grinding or the like.

After the series of processing for forming the cladding layer 10 and the plating layer 20, the entire die material 4A is fabricated into a predetermined final shape (by cutting, grinding, and mirror finishing), thereby completing manufacture of the die member 4. The die member 3 can be manufactured also in the same manner. Since the thermal deformation of the entire die material 4A by laser build-up welding is extremely small, the working allowance provided to the die material 4A may be extremely small or, depending on the case, the laser build-up welding and the plating can be performed also after the most portion of the die material 4A is fabricated into a predetermined final shape.

In the foregoing description, while it has been explained that each of the die members 3, 4 comprises a single piece, the die member can comprise a plurality of pieces, for example, when forming a large-sized die member. For example, the die member can be configured also by forming a portion for a predetermined range (for example, a range including a lip mating face and a lip end face) from the lip portion 9 as one piece (lip member having the cladding layer 10 and the plating layer 20), and joining the lip member with other pieces by using bolts, etc.

Figure 4:
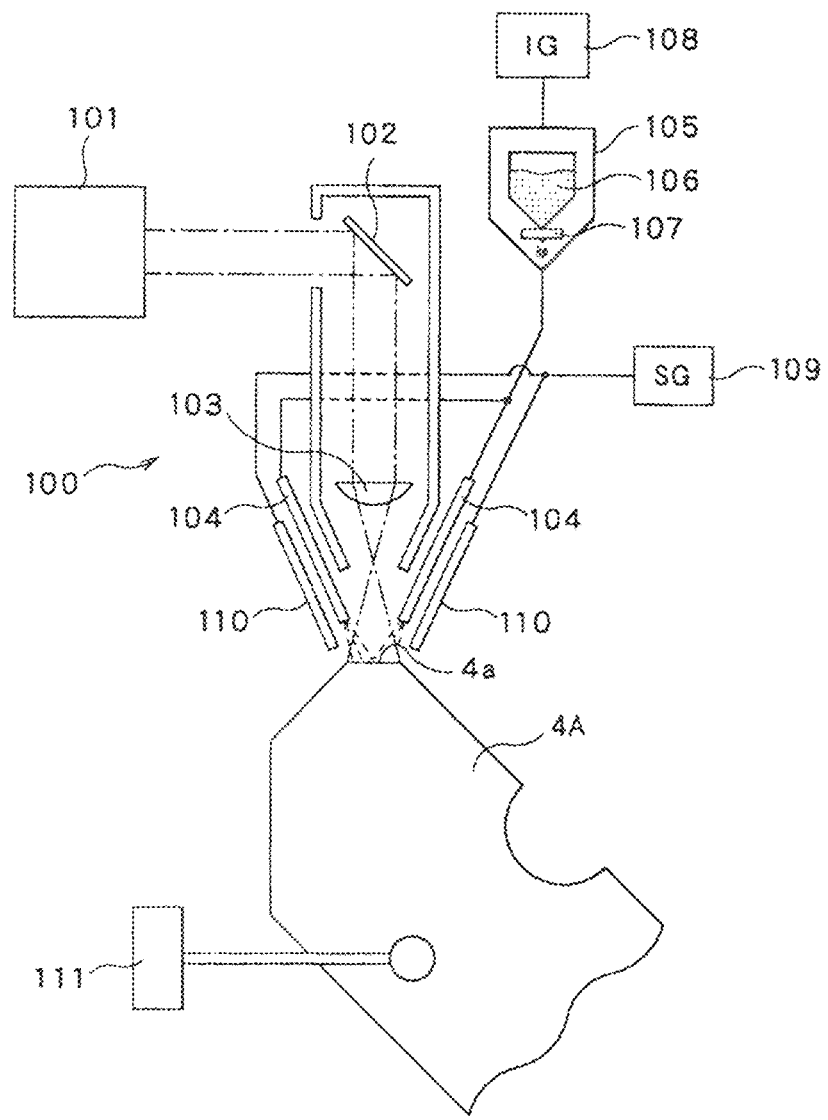
FIG. 4 is a diagram showing laser build-up welding for forming a cladding layer.

Then, the laser build-up welding is to be described with reference to FIG. 4. FIG. 4 is an explanatory view showing an example of a laser build-up welding apparatus suitable to formation of the cladding layer 10 described above. A laser light generated from a laser oscillator 101 is applied by way of a mirror 102 and a condenser lens 103 onto an inclined surface $4a$ of a die material 4A which is a base material to be cladded. In this case, a focal point is controlled such that the focus of the irradiated laser light is not situated on the surface of the die material 4A (not focused on the surface of the base material A). The laser light diameter at the focal point can be, for example, about 2.4 mm.

A pair of raw material powder supply nozzles 104 are attached being inclined each at a predetermined angle to a portion intended for cladding over the die material 4A. A hopper 106 for storing the raw material powder is provided in a raw material powder container 105, and a discharge amount of the raw material powder from the hopper 106 is controlled by a control disk 107. The raw material powder is preferably the nickel-based alloy powder or the cobalt-based alloy powder as described above. In view of the fluidity, a spherical atomized powder is more preferred. The raw material powder discharged from the hopper 106 is supplied from the raw material powder supply nozzle 104 together with a carrier gas comprising a non-reactive gas such as an inert gas supplied from a carrier gas supply source 108 to a portion intended for cladding. The raw material powder is melted by the energy of the laser light and cladded over the die material 4A. In this step, a shield gas comprising a non-reactive gas such as an inert gas is supplied from a shield gas supply source 109 by way of a shield gas nozzle 110 to the periphery of a portion intended for cladding. Accordingly, a large-scaled equipment such as a vacuum chamber for housing the welding device is not necessary. The die member 4A is held by a clamp 111. By providing a driving mechanism to the clamp 111 and moving the die material 4A in the direction perpendicular to the drawing, the cladding position can be transferred. The cladding position may also be displaced by moving the laser build-up apparatus (optical system and nozzle).

Specific conditions of laser build-up welding are described below. In particular, for the material such as the nickel-based alloy powder or the cobalt-based alloy powder incorporated with B (boron), which is hard and has high performance but which is liable to be cracked upon melting and solidification, the laser irradiation intensity is preferably controlled such that the incident energy of the laser applied to the surface of the base material is within a range of 30 to 150 $J/mm^2$. If the incident energy is less than 30 $J/mm^2$, since the amount of heat is insufficient, this tends to cause insufficient melting of the powder and insufficient bonding with the base material. On the other hand, if the incident energy is more than 150 $J/mm^2$, the uppermost surface of the base material is melted excessively, the constituent element of the base material, particularly, Fe (iron) diffuses extremely in the cladding layer, by which the composition of the cladding layer is greatly different from the composition of the metal powder failing to obtain desired characteristics. Further, the degree of shrinkage upon solidification increases by excess melting, tending to cause remarkable cracking.

Suitable build-up welding conditions include, for example, a laser output of 1300 W, a nozzle moving speed of 480 mm/min, and an incident energy of 86 $J/mm^2$. When a cladding layer was formed by using the (Ni based-1) alloy under the conditions, hardness near the edge portion of the cladding layer was 746 Hv and a hardness facilitating sharp edging could be obtained. A result in which the cladding layer is formed by using the (Ni based-1) alloy within a range out of the preferred incident energy range of the laser is also described. When welding was performed under the conditions at the laser output of 800 W, the nozzle moving speed of 240 mm/min, and the incident energy of 172 $J/mm^2$, the Fe content in the cladding layer was more than 30%, that is, the cladding layer comprised Fe (iron) as a main ingredient. In this case, the hardness was about 458 Hv and the cladding layer sometimes suffered from cracking. Naturally, corrosion resistance can be neither expected with such a composition. Further, when welding was performed under the conditions at the laser output of 800 W, the nozzle moving speed of 1440 mm/min, and the incident energy of 29 $J/mm^2$, many defects such as shrinkage cavity, blow hole, etc. occurred in the cladding layer and, further, melting and joining were insufficient, and the layer was detached from the base material during finishing.

According to the foregoing embodiment, the following excellent effects can be obtained.

Since the laser build-up welding used for forming the cladding layer 10 is performed by locally melting the metal by a laser light at a high energy density, heat effect on the base material (die material) can be mitigated. Further, since the cladding width can be decreased by using the powdery shape material instead of rod-like, wire-like, or filler-like material as the cladding material, the amount of heat input to the base material is decreased and the surface of the base material can be cladded by the wear resistant metal with no undesired effect on the base material.

Figure 5:
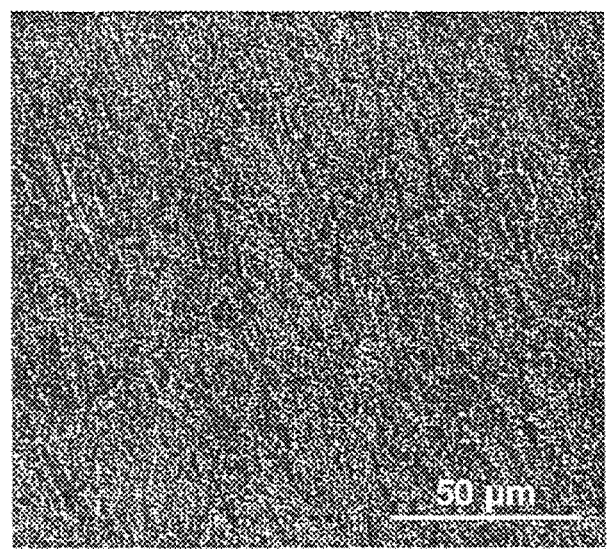
FIG. 5 is a copy of a microscopic photograph of a cladding layer formed by laser build-up welding.

Further, in the laser build-up welding, since the raw material powder is solidified by quenching after melting, the metallographic structure after solidification is extremely fine and homogeneous. In the fine metallographic structure, hardness is also improved by Hall-Petch rule and the like. In particular, in the Ni-based alloys-1 to 3 and the Co-based alloy-1, or alloys of compositions similar therewith, hard particles such B compounds (metal borides) are precipitated, and the hard particles thereof are extremely fine as 0.1 μm or less and they are extremely homogeneous. FIG. 5 shows a copy of metallographic photograph of a hard coating layer comprising the Ni-based alloy-1 formed by laser build-up welding (cladding layer 10). It is apparent also from the photograph that a metallographic structure in which hard particles such as fine metal borides (Mo boride, Ni—Mo boride, Ni boride, etc. in the example of the photograph) are dispersed in a binder phase (in this example, a phase in which Mo and Si are solid solubilized in Ni) is formed. While the composition of the emerging hard particles changes depending on the alloy ingredient, alloys used herein are in common in that they contain at least one of metal boride and metal carbide as the hard particles.

Figure 6A:
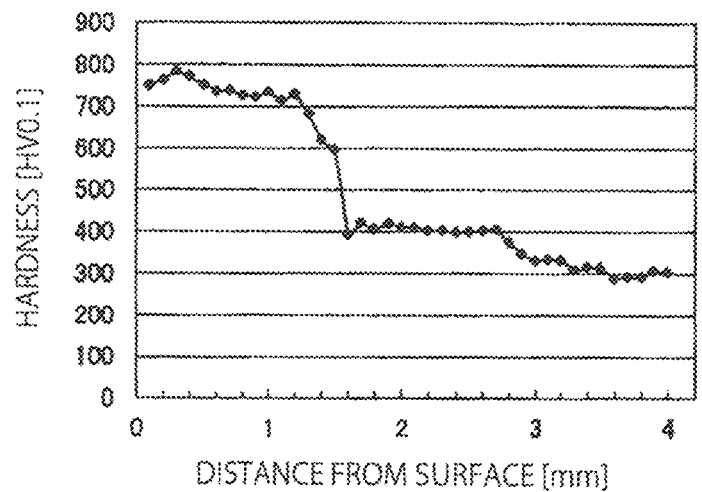
FIG. 6A is a graph showing a hardness distribution of a layer formed by laser build-up welding.
Figure 6B:
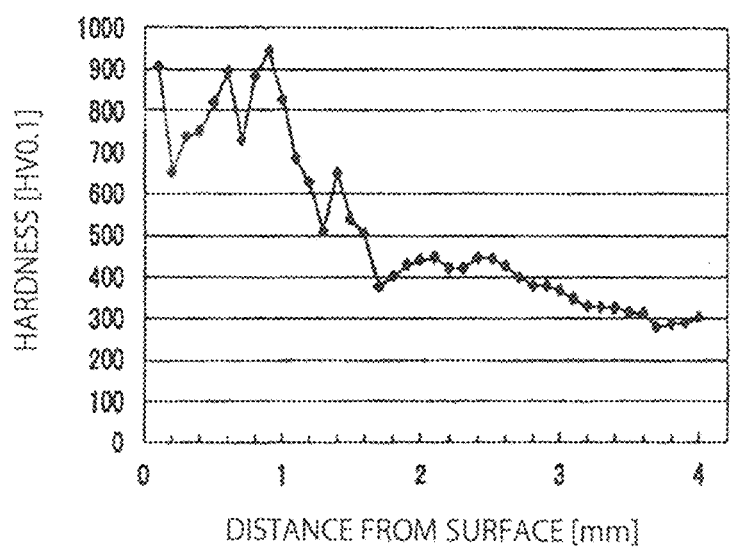
FIG. 6B is a graph showing a hardness distribution of a layer formed by HIP.

Since the hard coat layer formed by laser build-up welding has an extremely fine and homogeneous structure, the layer suffers less unevenness for the hardness caused by the dispersion state of hard particles in comparison with that formed by HIP or flame spraying by using the identical alloy. In HIP or flame spraying, since raw material powder is neither melted completely nor solidified by quenching, most of the hard particles have a particle diameter of 1 μm or more. It has been recognized generally that there is a difference in the hardness of 200 Hv or more between a portion containing hard particles and a portion not containing them in the hard coat layer formed by HIP or flame spraying. On the contrary, since the metallographic structure formed by laser build-up welding is fine and homogeneous, variation of the hardness in the hard coat layer is extremely small, which is confined within 40 Hv. FIG. 6A shows a hardness distribution in a hard coat layer formed by laser build-up welding and FIG. 6B shows a hardness distribution in a hard coat layer formed by HIP, respectively. It is apparent that the hard coat layer formed by laser build-up welding shows less variation in hardness.

Further, since the metallographic structure formed by laser build-up welding is fine and homogeneous, the surface roughness after final finishing such as polishing can be reduced extremely. Specifically, in the Ni-based alloy-1 described above, the surface roughness of the hard coat layer formed by laser build-up welding can be reduced to about 0.01 Ra by lap finishing, whereas the surface roughness of the hard coat layer formed by HIP can be reduced only to about 0.02 Ra. Also the Ni-based alloys-2 to 3 and the Co-based alloy-1 described above show a similar trend. Further, since the metallographic structure formed by laser build-up welding is fine and homogeneous, the edge portion 9e of the lip portion 9 can be finished to a sharp edge having an edge R at an order of 1 to several μm.

Further, different from the HIP treatment (refer to the paragraph for the background art), the laser build-up welding requires no extremely complicated preceding steps such as encapsulation for the periphery of a sintered portion, filling of the capsule with the alloy powder, capsule degassing and sealing, etc. Further, different from the HIP treatment, the laser build-up welding requires no large-scaled expensive equipment capable of providing a high temperature and a high pressure (for example, 1300° C., 130 MPa) for the entire die material.

Further, different from the HIP treatment, the laser build-up welding does not require to elevate the temperature of the entire die material to the vicinity of the melting temperature of the alloy to be bonded. Besides, only the vicinity of the laser light irradiation portion is locally heated. Thus, bending of the die material (for example, iron and steel material) is extremely small or negligibly small. This means that fabrication of the die material in anticipation of thermal deformation is not necessary or can be minimized.

Further, as apparent from comparison with the HIP treatment described above, when compared with the hard coat layer (cladding layer) obtained by flame splaying, the cladding layer 10 formed by the laser build-up welding has advantages as follows: (1) more tough and free from occurrence of chipping, peeling, or cracking during grinding or polishing; (2) free from lowering of the bonding strength or occurrence of bonding defect at the boundary between the cladding layer 10 and the hard chromium plating layer 20; and (3) improved significantly in the surface roughness of the lip portion 9 formed with the cladding layer 10.

Further, since the cladding layer 10 formed by laser build-up welding shows penetration to the die main body 3, 4 as the base material, the bonding strength with the base material is increased outstandingly when compared with that of the cladding layer formed by flame spraying.

When damage such as chipping is caused at the lip portion 9, particularly, at the edge portion 9e thereof, this can be repaired by grinding the cladding layer 10 (also together with the hard chromium plating layer 20) until the damage can no more be discriminated. Generally, in a case where a defect of 0.01 mm or more occurs, this is out of an allowable range and repairs will be made. The repairs can be repeated over and over until the cladding layer 10 and the hard chromium layer 20 formed initially are eliminated. The hard chromium plating layer 20 can be restored at a reduced cost by a reverse electrifying treatment (plating peeling treatment) and a re-plating treatment.

When a relatively large defect occurs in the lip portion 9 and, if the size of the defect does not exceed the width W1, W2 of the cladding layer 10, the defect can be filled by the laser build-up welding. The defect can be repaired locally and instantaneously by changing the diameter of the laser light by changing the focal position of the laser. Since the repaired portion is piled up, grinding is applied such that the repaired portion is flush with the peripheral portion. Even when the defect is repaired by laser build-up welding, the thermal effect remains local. Accordingly, the chromium plating layer 20 at the periphery undergoes no undesired effect, thus the defect can be repaired to a state identical with that of a new product without peeling of plating or re-plating. Further, the die members 3, 4 are not distorted by the heat effect during repairs. That is, the repairing period is short and the quality of the die member after repairs is also satisfactory. Further, since such a large defect as exceeding the width W2 of the cladding layer 10 (2.4 mm at the maximum in the case of the embodiment described above) scarcely occurs, the defect can be coped with by any of the repairing methods described above.

In the embodiment described above, while the T-die was used for extruding the molten resin, it may be used for discharging a coating solution.

DESCRIPTION OF REFERENCE CHARACTERS

1: T-die
2: Die main body
3, 4: Die member
4A: Material, base material (die material)
4a: Third surface (inclined surface)
4b: First surface (surface as lip mating face)
4c: Second surface (surface as lip end face)
5: (Fluid material flow channel) molted resin flow channel
8: Discharge port
9: Lip portion
9e: Edge portion of lip portion
10: Cladding layer
10b, 10c: Surface of cladding layer
10: Edge portion of cladding layer
20: Plating layer

The invention claimed is:

1. A method of manufacturing a T-die, the T-die including a die main body, the die main body being provided therein with a fluid material flow channel, and the die main body having a lip portion that forms a slit-shaped discharge portion at a tip end of the fluid material flow channel, the method including:
   providing a base material forming the die main body and having a first surface that is a lip mating face, a second surface that is a lip end face, and a third surface that connects the first surface and the second surface and is inclined thereto;
   thereafter forming a cladding layer by laser build-up welding over the third surface with a powder of a corrosion resistant and wear resistant alloy;
   forming, after forming the cladding layer, a plating layer over the surface of the cladding layer and over the first and second surfaces of the base material; and
   thereafter grinding the plating layer and the cladding layer to remove the plating layer formed on the cladding layer such that the cladding layer is exposed and the cladding layer has first and second ground surfaces flush with first and second ground surfaces of the plating layer lying over the first and second surfaces of the base material, respectively.

2. The method according to claim 1, wherein the width of the third surface is not smaller than 0.28 mm but not larger than 3 mm.

3. A method of manufacturing a T-die, the T-die including a die main body, the die main body being provided therein with a fluid material flow channel, and the die main body having a lip portion that forms a slit-shaped discharge portion at a tip end of the fluid material flow channel, the method including:
   providing a base material forming the die main body and having a first surface that is a lip mating face, a second surface that is a lip end face, and a third surface that connects the first surface and the second surface and is inclined thereto;
   thereafter forming a cladding layer by laser build-up welding over the third surface with a powder of a corrosion resistant and wear resistant alloy;

grinding the cladding layer to cause the cladding layer to have a first ground surface, a second ground surface and an edge at an intersection of the first and second ground surfaces;

grinding the first and second surfaces of the base material after the grinding of the cladding layer such that the first surface of the base material thus ground has a level lower than that of the first ground surface of the cladding layer and that the second surface of the base material thus ground has a level lower than that of the second ground surface of the cladding layer.

4. The method according to claim 3, further comprising forming, after the grinding of the cladding layer and after the grinding of the first and second surfaces of the base material, a plating layer over the surface of the cladding layer and over the first and second surfaces of the base material; and thereafter grinding the plating layer and the cladding layer to remove the plating layer formed on the cladding layer such that the cladding layer is exposed and the cladding layer has first and second ground surfaces flush with first and second ground surfaces of the plating layer lying over the first and second surfaces of the base material, respectively.

5. The method according to claim 1, wherein the method manufactures the T-die having the cladding layer extending at a first width within a range of 0.2 to 1.7 mm from the edge of the lip portion along a lip mating face, and extending at a second width within a range of 0.2 to 2.4 mm from the edge of the lip portion along a lip end face.

6. The method according to claim 1, wherein the cladding layer has a metallographic structure in which metal borides or metal carbides are dispersed in a nickel-based or cobalt-based binder phase.

7. The method according to claim 6, wherein the laser build-up welding uses a laser whose incident energy applied to the surface of the base material is within a range of 30 to 150 J/mm$^2$.

* * * * *